United States Patent
Abd Elhamid et al.

(10) Patent No.: US 8,470,488 B2
(45) Date of Patent: Jun. 25, 2013

(54) METALLIC BIPOLAR PLATES WITH HIGH ELECTROCHEMICAL STABILITY AND IMPROVED WATER MANAGEMENT

(75) Inventors: Mahmoud H. Abd Elhamid, Grosse Pointe Woods, MI (US); Gayatri Vyas, Rochester Hills, MI (US); Youssef M. Mikhail, Sterling Heights, MI (US); Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2472 days.

(21) Appl. No.: 11/286,962

(22) Filed: Nov. 23, 2005

(65) Prior Publication Data

US 2007/0117003 A1    May 24, 2007

(51) Int. Cl.
*H01M 2/38* (2006.01)
(52) U.S. Cl.
USPC ............ 429/456; 429/457; 429/518; 429/522
(58) Field of Classification Search
USPC .......................... 429/210, 456, 457, 518, 522
See application file for complete search history.

(56) References Cited

U.S. PATENT DOCUMENTS

| 6,670,066 | B2 | 12/2003 | Tsuji et al. |
| 2004/0081879 | A1 | 4/2004 | Washima et al. |
| 2004/0091768 | A1 | 5/2004 | Abd Elhamid |
| 2004/0101738 | A1 | 5/2004 | Tawfik et al. |
| 2005/0181264 | A1 | 8/2005 | Gu |
| 2005/0214618 | A1 * | 9/2005 | Oh et al. .................. 429/34 |

FOREIGN PATENT DOCUMENTS

| JP | 3-061379 A | | 3/1991 |
| JP | 11-219713 A | | 8/1999 |
| JP | 11219713 A | * | 8/1999 |
| JP | 2001-093539 A | | 4/2001 |
| WO | WO 99/41795 A1 | | 8/1999 |
| WO | WO 2005/083815 A1 | | 9/2005 |

* cited by examiner

*Primary Examiner* — Jane Rhee
(74) *Attorney, Agent, or Firm* — John A. Miller; Miller IP Group, PLC

(57) ABSTRACT

A flow field plate or bipolar plate for a fuel cell that includes a carbide coating that makes the bipolar plate conductive, hydrophilic and stable in the fuel cell environment. Suitable carbides include, but are not limited to, chromium carbide, titanium carbide, tantalum carbide, niobium carbide and zirconium carbide. The carbide coating is then polished or textured by a suitable process, such as laser or chemical etching, to provide a surface morphology that makes the coating more hydrophilic, and further reduces the contact resistance on its surface.

14 Claims, 1 Drawing Sheet

METALLIC BIPOLAR PLATES WITH HIGH ELECTROCHEMICAL STABILITY AND IMPROVED WATER MANAGEMENT

BACKGROUND OF THE INVENTION

1. Field of the Invention

This invention relates generally to bipolar plates for fuel cells and, more particularly, to a bipolar plate for a fuel cell that includes a carbide layer that is electrically conductive, electro-chemically stable and hydrophilic.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are popular fuel cells for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane defines a membrane electrode assembly (MEA).

Several fuel cells are typically combined in a fuel cell stack to generate the desired power. The automotive fuel cell stack mentioned above may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic.

US Patent Application Publication No. 2003/0228512, assigned to the assignee of this application, discloses a process for depositing a conductive outer layer on a flow field plate that prevents the plate from oxidizing and increasing its ohmic contact. U.S. Pat. No. 6,372,376, also assigned to the assignee of this application, discloses depositing an electrically conductive, oxidation resistant and acid resistant coating on a flow field plate. US Patent Application Publication No. 2004/0091768, also assigned to the assignee of this application, discloses depositing a graphite and carbon black coating on a flow field plate for making the flow field plate corrosion resistant, electrically conductive and thermally conductive.

As is well understood in the art, the membrane within a fuel cell needs to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water may accumulate within the flow channels because the flow rate of the reactant gas is too low to force the water out of the channels. As the water accumulates, it forms droplets that continue to expand because of the relatively hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed by the present inventors to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where β is the static contact angle and α is the channel corner angle. For a rectangular channel α/2=45°, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

Also, as is well understood in the art, hydrofluoric acid is generated as a result of degradation of the perfluorosulfonic ionomer in the membrane during operation of the fuel cell. The hydrofluoric acid has a corrosive effect on the bipolar plates that make them electro-chemically unstable.

Stainless steel bipolar plates may have instability problems especially when the fluoride release rate of the membrane exceeds $1 \times 10^{-8}$ g/cm$^2$/hr. It is known in the art to use various grades of stainless steel for the bipolar plates in a fuel cell stack. High grade stainless steel, for example 904L or carpenter 20, have been shown to provide significant improvement in electro-chemical stability for such fluoride release rates. However, high grade stainless steel alloys of this type are typically 3-4 times more expensive than lower grade stainless alloys, such as SS316L and 304L. Therefore, from a cost perspective, it would be desirable to use the lower grade stainless steel for bipolar plates.

U.S. Pat. No. 6,670,066 issued Dec. 30, 2003 to Tsuji et al., titled Separator for Fuel Cell, discloses a bipolar plate for a fuel cell that embeds chromium carbide into the steel of the bipolar plate. The surface of the bipolar plate facing the diffusion media layer in the fuel cell is then polished to expose carbide particles in the steel matrix that decreases the contact resistance of the plate to the diffusion media layer. Carbide particles typically have a good electro-chemical stability in that they do not readily corrode. However, a problem exists with this procedure of growing chromium carbide in steel because the chromium in the stainless steel material is depleted, which reduces its corrosion resistance. Thus, in order to provide a low contact resistance provided by the carbide, a high grade of steel is required so that the chromium in the steel is not depleted to an extent where the corrosion resistance is significantly reduced. Also, some stainless steel bipolar plates are stamped when they are formed. By providing chromium carbide within the stainless steel, the stainless steel is much harder, which affects the stamping process.

SUMMARY OF THE INVENTION

In accordance with the teachings of the present invention, a flow field plate or bipolar plate for a fuel cell is disclosed that includes a carbide coating that makes the bipolar plate conductive, hydrophilic and stable in the fuel cell environment. Suitable carbides include, but are not limited to, chromium carbide, titanium carbide, tantalum carbide, niobium carbide and zirconium carbide. The carbide coating is polished or textured by a suitable process, such as laser or chemical etching, to provide a surface morphology that makes the coating more hydrophilic.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a bipolar plate for a fuel cell that includes a carbide coating for making the plate conductive, hydrophilic and stable in a fuel cell environment is merely exemplary in nature, and is in no way intended to limit the invention or its applications or uses.

Figure 1:
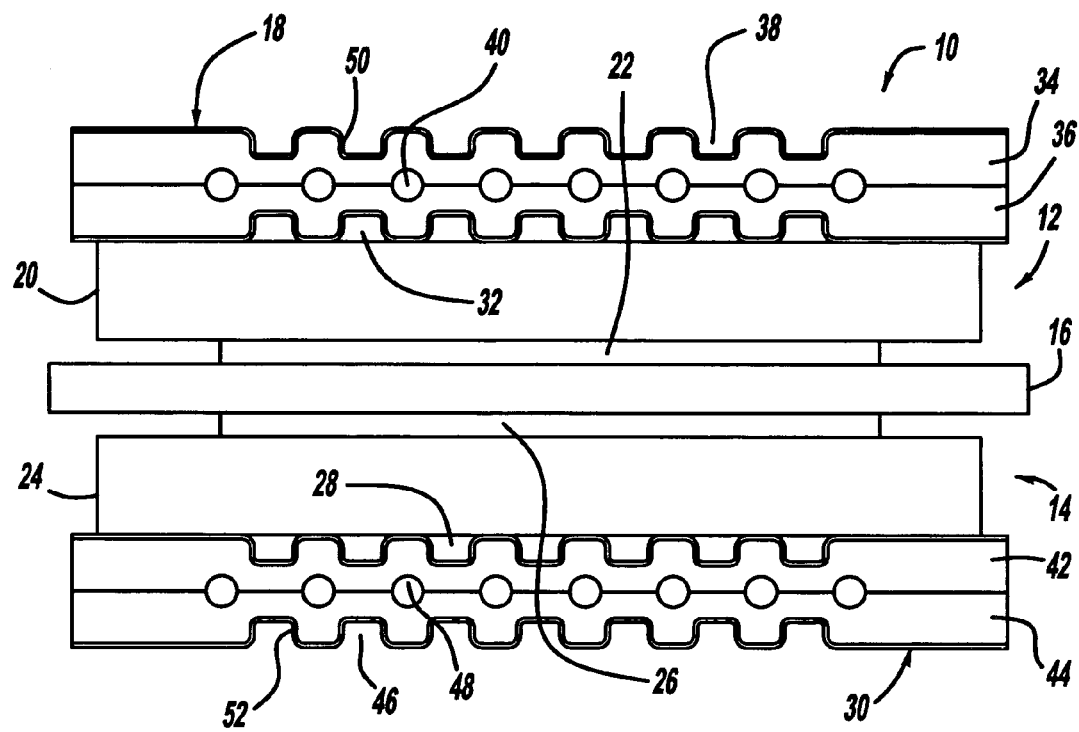
FIG. 1 is a cross-sectional view of a fuel cell in a fuel cell stack that includes bipolar plates having a carbide coating that makes the plate conductive, hydrophilic and stable in a fuel cell environment.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The end product is water, which does not have any negative impact on the environment.

In this non-limiting embodiment, the bipolar plate 18 includes two sheets 34 and 36 that are stamped and formed together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48.

According to one embodiment of the present invention, the bipolar plates 18 and 30 include a carbide layer 50 and 52, respectively, that makes the plates 18 and 30 conductive, corrosion resistant, hydrophilic and stable in the fuel cell environment. Suitable carbides include, but are not limited to, chromium carbide, titanium carbide, tantalum carbide, niobium carbide and zirconium carbide. Because the layers 50 and 52 provide the corrosion resistance, stability and contact resistance for the bipolar plates 18 and 30, the sheets 34, 36, 42 and 44 can be made of a low grade stainless steel, such as 304L and SS316L, and can be readily formed by a suitable stamping process.

Before the carbide layers 50 and 52 are deposited on the bipolar plates 18 and 30, respectively, the bipolar plates 18 and 30 are cleaned by a suitable process, such as ion beam sputtering, to remove the resistive oxide film on the outside of the plates 18 and 30 that may have formed. The carbide layers 50 and 52 can be deposited on the bipolar plates 18 and 30 by any suitable technique, including, but not limited to, physical vapor deposition processes, chemical vapor deposition processes, thermal spraying process, spin coating processes, dip coating processes and sol-gel processes. Suitable examples of physical vapor deposition processes include electron beam evaporation, magnetron sputtering and pulsed plasma processes. Suitable examples of chemical vapor deposition processes include plasma enhanced chemical vapor deposition processes, atmospheric pressure vapor deposition processes and atomic layer deposition processes. In one non-limiting embodiment, the layers 50 and 52 are deposited to a thickness of 1-10 µm.

Figure 2:
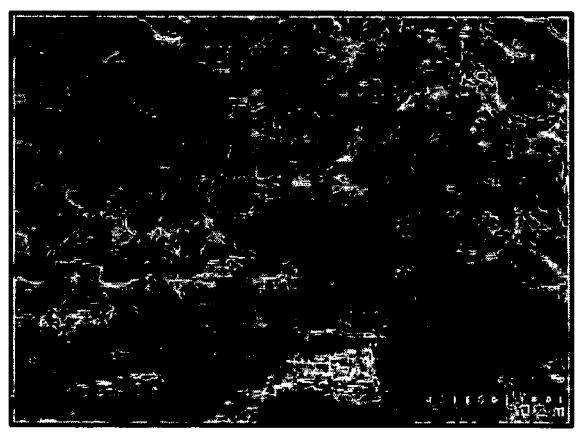
FIG. 2 is a scanning electron microscope picture of a carbide layer on stainless steel that has been textured to make it hydrophilic.

Once the carbide layers 50 and 52 are deposited on the bipolar plates 18 and 30, they are then polished or textured by a suitable texturing process, such as laser or chemical etching. By roughening the surfaces of the layers 50 and 52 in this manner, the electrical contact resistance is reduced and the hydrophilicity of the layers 50 and 52 is also increased. FIG. 2 is a scanning electron microscope (SEM) picture showing a chromium carbide layer deposited on stainless steel that has been textured in this manner by such a process.

The hydrophilicity of the layers 50 and 52 causes the water within the flow channels 28 and 32 to form a film instead of water droplets so that the water does not significantly block the flow channels. Particularly, the hydrophilicity of the layers 50 and 52 decreases the contact angle of water accumulating in the flow channels 32, 38, 28 and 46, preferably below 20°, so that the reactant gases delivers the flow through the channels at low loads.

Further, by making the bipolar plates 18 and 30 more conductive, the electrical contact resistance between the fuel cells and the losses in the fuel cell are reduced, thus increasing cell efficiency. Also, an increase in the conductivity of the layers 50 and 52 provides a reduction in compression force in the stack, addressing certain durability issues within the stack.

Also, the carbide layers 50 and 52 are stable, i.e., corrosion resistant. The hydrofluoric acid generated as a result of degradation of the perfluorosulfonic ionomer in the membrane 16 during operation of the fuel cell 10 does not corrode the carbide layers 50 and 52.

When the carbide layer 52 is deposited on the bipolar plate 30, it can be deposited on the sides of the sheets 42 and 44 where the cooling fluid flow channels 48 are provided so that the sheets 42 and 44 do not need to be welded together. Likewise, when the carbide layer 50 is deposited on the bipolar plate 18, it can be deposited on the sides of the sheets 34 and 36 where the cooling fluid flow channels 40 are provided so that the sheets 34 and 36 do not need to be welded together. This is because the chromium carbide provides a good ohmic contact between the sheets for the conduction of electricity. Therefore, instead of the laser welding that would bond the plates and provide the electrical contact between the sheets in the prior art, the sheets need only be sealed around the edges to seal the bipolar plates.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a flow field plate being made of a low grade stainless steel, said flow field plate including a plurality of reactant gas flow channels responsive to a reactant gas, said flow field plate further including a carbide layer having a textured surface formed by a texturing process after the carbide layer is deposited that makes the plate conductive, hydrophilic and stable in a fuel cell environment.

2. The fuel cell according to claim 1 wherein the carbide layer is selected from the group consisting of a chromium carbide layer, a titanium carbide layer, a tantalum carbide layer, a niobium carbide layer and a zirconium carbide layer.

3. The fuel cell according to claim 1 wherein the carbide layer has a thickness in the range of 1-10 µm.

4. The fuel cell according to claim 1 wherein the carbide layer is deposited on the flow field plate by a process selected from the group consisting of an electron beam evaporation process, magnetron sputtering, a pulse plasma process, plasma enhanced chemical vapor deposition, an atomic layer deposition process, spin coating process, dip coating process, thermal spraying and a sol-gel process.

5. The fuel cell according to claim 1 wherein the texturing process is selected from the group consisting of chemical etching and laser etching.

6. The fuel cell according to claim 1 wherein the flow field plate includes two stamped sheets defining cooling fluid flow channels therebetween, and wherein the carbide layer is provided on both sides of the sheets so as to eliminate the need for bonding the plates using known bonding techniques.

7. A method for making a flow field plate for a fuel cell, said method comprising:
   providing a flow field plate structure including a plurality of reactant gas flow channels;
   depositing a carbide layer on the flow field plate structure to make the plate structure conductive, hydrophilic and stable in a fuel cell environment; and
   roughening the carbide layer by a texturing process.

8. The method according to claim 7 wherein providing a flow field plate structure includes providing a flow field plate structure being made of a low grade stainless steel.

9. The method according to claim 7 wherein providing a flow field plate structure includes providing a flow field plate structure including two stamped sheets defining cooling fluid flow channels therebetween, and wherein depositing the carbide layer includes depositing the carbide layer on both sides of the sheets so as to eliminate the need for bonding the plates using known bonding techniques.

10. The method according to claim 7 wherein the carbide layer is selected from the group consisting of a chromium carbide layer, a titanium carbide layer, a tantalum carbide layer, a niobium carbide layer and a zirconium carbide layer.

11. The method according to claim 7 wherein depositing the carbide layer includes depositing the carbide layer to a thickness in the range of 1-10 µm.

12. The method according to claim 7 wherein depositing the carbide layer includes depositing the carbide layer by a process selected from the group consisting of an electron beam evaporation process, magnetron sputtering, a pulse plasma process, plasma enhanced chemical vapor deposition, an atomic layer deposition process, spin coating process, dip coating process, thermal spraying and a sol-gel process.

13. The method according to claim 7 wherein the texturing process is selected from the group consisting of chemical etching and laser etching.

14. The method according to claim 7 wherein the flow field plate is selected from the group consisting of anode side flow field plates and cathode side flow field plates.

* * * * *